(12) United States Patent
Park

(10) Patent No.: US 7,209,113 B2
(45) Date of Patent: Apr. 24, 2007

(54) STYLUS PEN EXPANSION SLOT

(75) Inventor: Jeekyoung Park, Tustin, CA (US)

(73) Assignee: Gateway Inc., Irvine, CA (US)

( * ) Notice: Subject to any disclaimer, the term of this patent is extended or adjusted under 35 U.S.C. 154(b) by 698 days.

(21) Appl. No.: 10/142,235

(22) Filed: May 9, 2002

(65) Prior Publication Data

US 2003/0210223 A1 Nov. 13, 2003

(51) Int. Cl.
*G09G 5/00* (2006.01)
(52) U.S. Cl. .................................. 345/156; 345/179
(58) Field of Classification Search ................ 345/156, 345/179, 184; 710/1; 178/19.01–19.05
See application file for complete search history.

(56) References Cited

U.S. PATENT DOCUMENTS

| | | | |
|---|---|---|---|
| 5,658,157 A | 8/1997 | Koiwa et al. ............... 439/165 |
| 5,739,791 A | 4/1998 | Barefield et al. ........... 343/702 |
| 5,835,732 A | 11/1998 | Kikinis et al. .............. 395/281 |
| 6,032,866 A * | 3/2000 | Knighton et al. ........... 235/492 |
| 6,052,279 A * | 4/2000 | Friend et al. ............... 361/686 |
| 6,262,684 B1 | 7/2001 | Stewart et al. .............. 343/702 |
| 6,424,369 B1 * | 7/2002 | Adair et al. .................. 348/76 |
| 6,507,336 B1 * | 1/2003 | Lunsford ..................... 345/168 |
| 6,525,928 B1 * | 2/2003 | Madsen et al. ............. 361/683 |
| 6,532,148 B2 * | 3/2003 | Jenks et al. ................. 361/683 |
| 6,535,199 B1 * | 3/2003 | Canova et al. ............. 345/168 |
| 6,607,216 B1 * | 8/2003 | Stenger et al. ................ 281/39 |
| 2003/0002248 A1* | 1/2003 | Nakaya et al. ............. 361/683 |

OTHER PUBLICATIONS http://www.zdnetasia.c.../story/0,2000040167,30085872,00.htm.

* cited by examiner

*Primary Examiner*—Regina Liang
(74) *Attorney, Agent, or Firm*—Jeffrey A. Proehl; Woods Fuller Shultz & Smith

(57) ABSTRACT

A hand-held computing system includes a housing with an elongated opening for receiving a nonelectronic input device. The elongated opening has an inside surface. At least two electrical contacts are positioned on the inside surface of the elongated opening. A connector includes at least two electrical contacts for electrically contacting the at least two electrical contacts on the inside surface of the elongated opening. A cable or other electrical connector places a peripheral computing device, battery or keyboard, in communication with the microprocessor within the housing of the personal data assistant.

7 Claims, 7 Drawing Sheets

STYLUS PEN EXPANSION SLOT

FIELD OF THE INVENTION

The present invention is related to a hand-held information handling system and, in particular, to an apparatus for a personal data assistant.

BACKGROUND OF THE INVENTION

Computer systems have become more common in the workplace and in the home. Now business people can carry a pocket-sized, hand-held information handling system with them at all times. The information handling system, such as a personal data assistant, includes an address and phone number list, and a calendar. Personal data assistants even include E-mail capability. The trend with most information handling systems is to add capability through technological advances. The same has been true with these hand-held information handling systems or personal data assistants. Initially, the personal data assistants came with the capability to synchronize data with another computer. As a result, the user could make changes to data on the personal data assistant and then upload the changes to another computer system. This is referred to as synchronizing the data. Just like other information handling systems, more capability has been added over the years to hand-held information handling devices. For example, the capability to send messages and communicate remotely has been provided to the personal data assistants. As a result, some models of personal data assistants include an antenna for remote communications. Other models have been provided with an extra bay for receiving a memory module. It is anticipated that further capabilities will be added in the future. In addition, it is anticipated that there will be a need to add ports so that other peripheral devices can be used with the hand-held information handling system or personal data assistant. The size or form factor associated with most hand-held information handling systems such as a personal data assistant, has received wide market acceptance. There is reluctance toward increasing the size of such information handling systems. Therefore, there is a further need to provide expansion slots without increasing the size of the hand-held information handling system.

SUMMARY OF THE INVENTION

A hand-held computing system includes a housing with an elongated opening for receiving a nonelectronic input device. The elongated opening has an inside surface. At least two electrical contacts are positioned on the inside surface of the elongated opening. In one embodiment, the nonelectronic input device is a stylus. The hand-held computing system also includes a cable with at least two electrical contacts for electrically contacting the at least two electrical contacts on the inside surface of the elongated opening. A microprocessor is positioned within the housing. The cable places a peripheral computing device in communication with the microprocessor within the housing.

The hand-held computing system includes a cover portion adapted to to cover at least a portion of the housing, and a connection portion having an end, which fits within the elongated opening. In some embodiments, the connection portion has at least two electrical contacts which contact the at least two electrical contacts on the inside surface of the elongated opening. The cover portion is attached to the connection portion. In some embodiments, the cover portion includes an edge and the connection portion is attached to the cover portion along the edge of the cover portion. In some embodiments the cover portion includes a keyboard or a battery. In some embodiments, the cover portion includes both a keyboard and a battery. The hand-held computing system also includes a display. The housing has an opening therein. The display fits within the opening in the housing. The cover portion is dimensioned to covers the display or at least a portion of the display. The cover portion can include a stylus holder which can be positioned proximate to the edge of the cover portion. In some embodiments, the elongated opening can include a sensor for enabling power and signals to the at least two electrical contacts located on the interior of the elongated opening. The sensor can be positioned within the elongated opening at a position distal from the at least two contacts. The sensor can determine if a substitute for the stylus has been inserted into the elongated opening.

Also disclosed is a method for expanding a hand-held personal organization device. The method includes finding an existing structure having a mating portion on the housing, adding at least two electrical contacts to the existing structure, and substituting a substitute mating portion for the original mating portion. The substitute mating portion has at least two electrical contacts, which correspond to the added electrical contacts of the existing structure. The two electrical contacts can be added to the interior of the existing structure. The method can also include sensing when the substitute mating portion has been inserted into the existing structure or sensing when the substitute mating portion has been fully inserted into the existing structure.

Another aspect of the invention contemplates a device including a plug adapted to fit within the stylus opening in the hosing of a personal data assistant. A second electrical portion is attached to the plug. The second electrical portion is adapted to be electrically connected to an information handling system housed within a personal data assistant. The device also includes a stylus and a structure for holding the stylus attached to the second electrical portion. The second electrical portion can be a peripheral device.

DESCRIPTION OF THE EMBODIMENTS

In the following detailed description of the embodiments, reference is made to the accompanying drawings, which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

Figure 1:
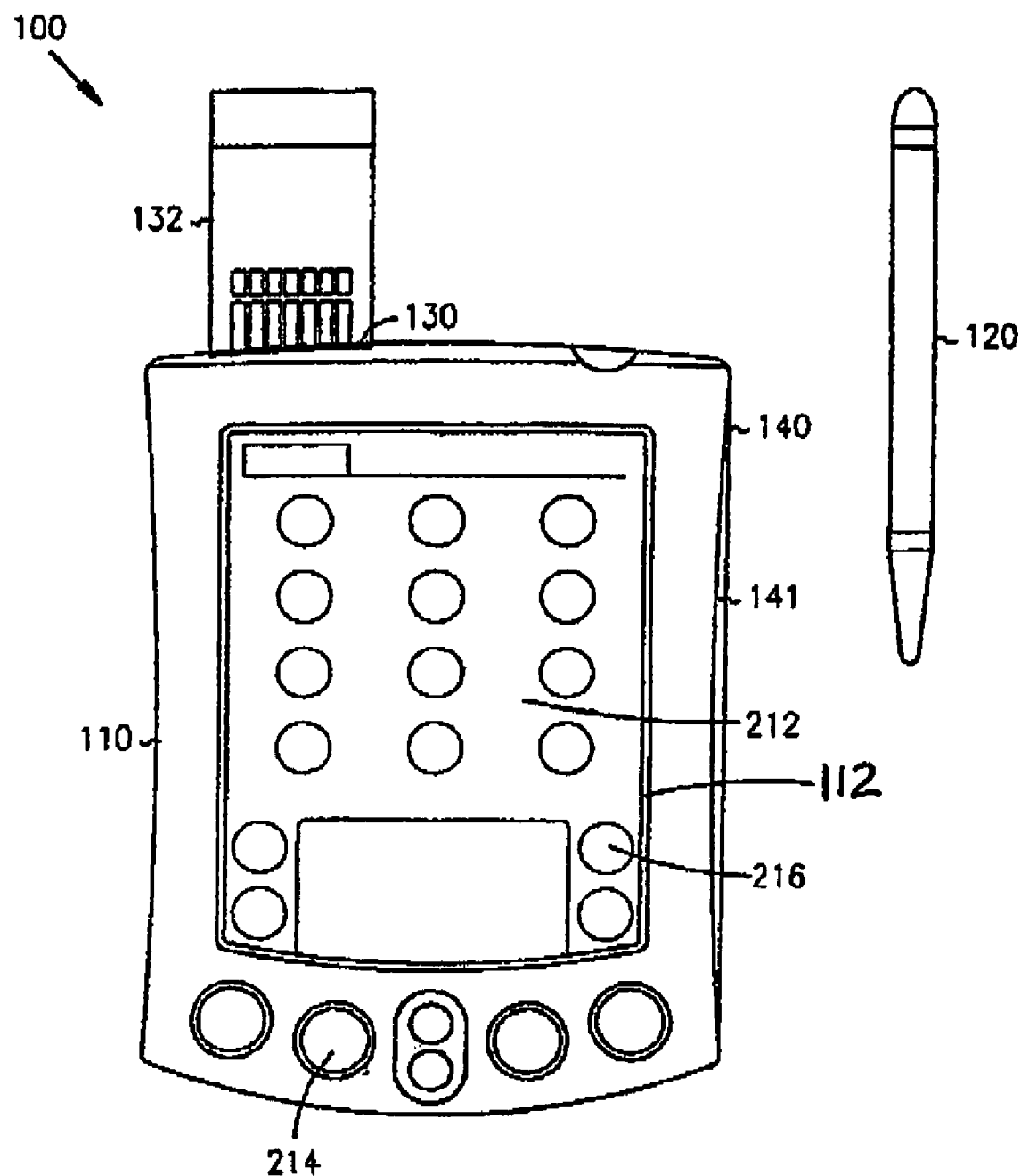
FIG. 1 is a perspective view of a personal data assistant type of hand-held computer system.
Figure 3:
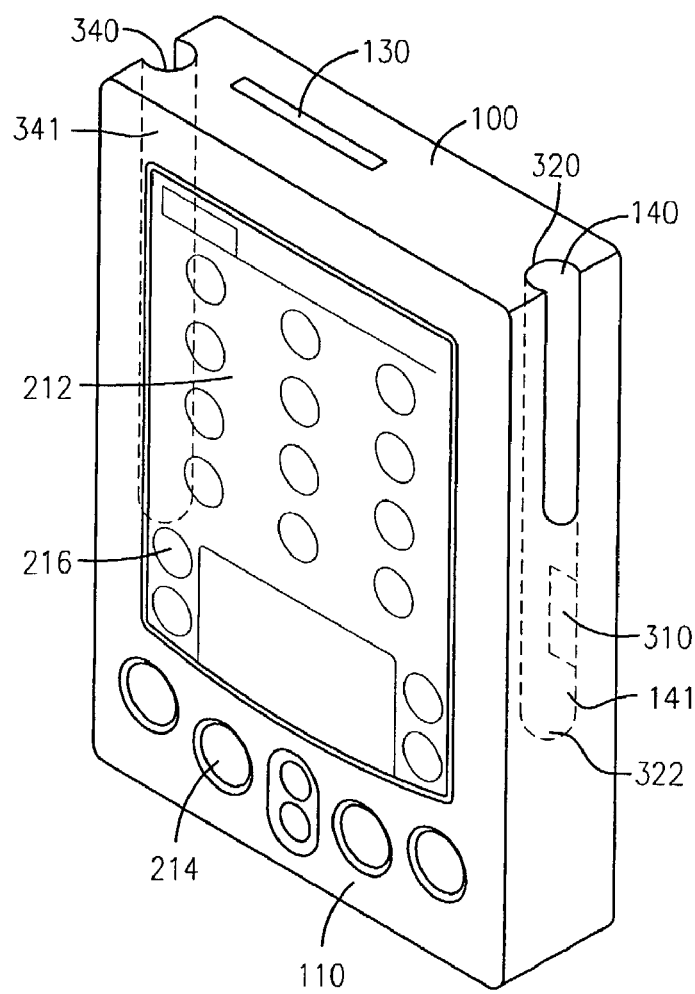
FIG. 3 is a perspective view of an embodiment of a hand-held computer system according to this invention.

FIG. 1 is a perspective view of a personal data assistant type of hand-held computer system 100, which employs the invention. The personal data assistant type of hand-held computer system 100 includes a housing 110. The housing 110 includes an opening 112. A display 212 is viewable through the opening 112 in the housing 110. The housing 110 also includes a set of control buttons 214 for inputting a set of commands to the hand-held computer system 100. A substantially transparent touch panel 216 overlays the display 212. A stylus 120 is used to input other information by either touching the touch panel 216 at certain areas or by making a set of strokes in a designated area of the touch panel 216. The housing 100 also includes a first expansion slot 130 for receiving peripheral devices 132. In FIG. 1 a set amount of memory is shown as the peripheral device 132 removed from the first expansion slot 130. The housing also includes a second expansion slot 140. The second expansion slot 140 doubles as a place for holding the stylus 120. The second expansion slot 140 is an elongated slot having an interior surface 141. The interior surface 141 includes a set of electrical contacts 310 (as shown in FIG. 3). The stylus 120 is non-conducting so inserting the stylus 120 into the expansion slot 140 does not result in forming a connection between the electrical contacts. It should be noted that many models of hand-held computer system 100 include two elongated slots. One is located on one edge of the hand-held computer system 100 and the other is found on the opposite edge of hand-held computer system 100. The two elongated slots can be used to hold a stylus on either side of the hand-held computer system 100. This accommodates both left handed and right-handed users as either can stow the stylus 120 on the edge of the housing 110 that is most convenient. The embodiment shown in FIG. 1 uses one of the elongated slots as an expansion slot 140. In another embodiment, both slots may be used as expansion slots.

The personal data assistant type of hand-held computer system 100 shown is similar to a Palm m500 available from Palm Inc. located at 5470 Great America Parkway in Santa Clara, Calif. USA 95054. The device shown is similar to one type and model of personal data assistant type of hand-held computer system 100. There are other manufacturers of personal data assistant type of hand-held computer system 100 which are similar to the device shown in FIG. 1. The other manufacturers include Sony and Handspring. The invention could be used in any type of personal data assistant or hand-held computer system 100 and, therefore, is not limited to a particular maker of such a hand-held computer. In addition, it should be pointed out that any hand-held computer, such as a pocket personal computer, could be adapted for use of the invention described and claimed.

Figure 2:
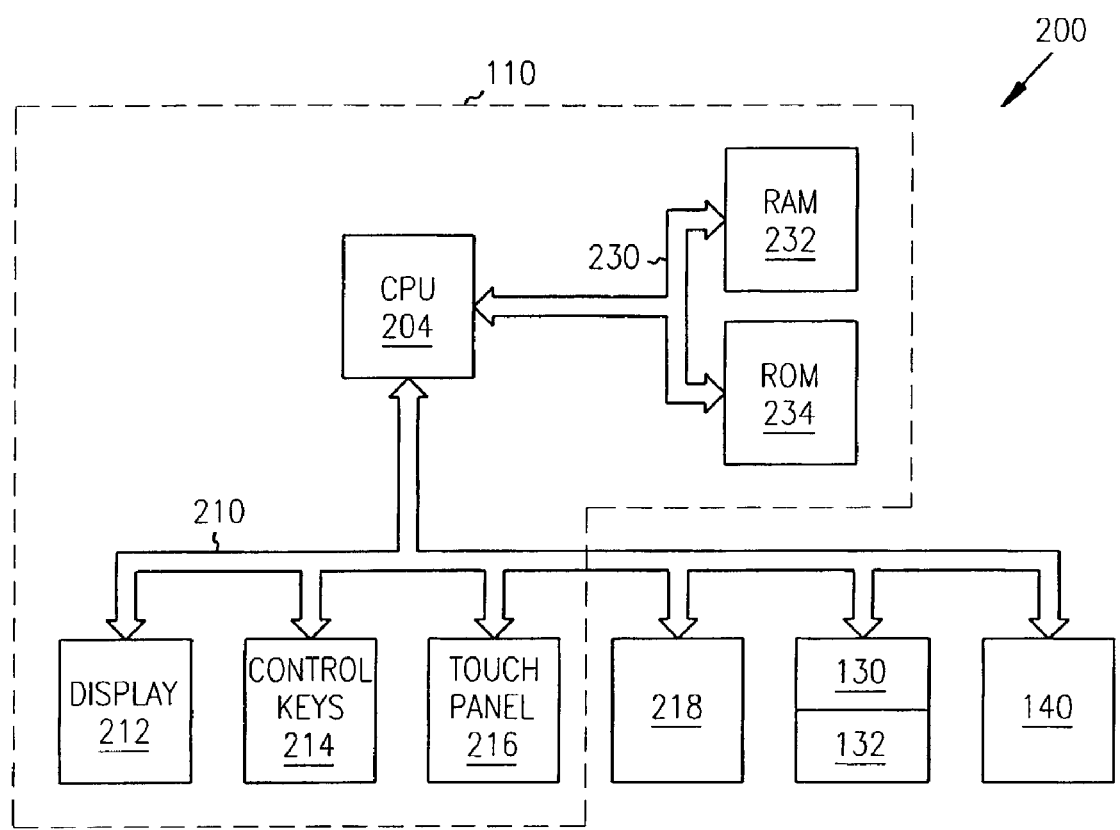
FIG. 2 is a block diagram of a computer system according to the present invention.

FIG. 2 is a schematic view of a hand-held computer system 100. The computer system may also be called an electronic system or an information handling system. The information handling system includes 200 includes a central processing unit 204, a random access memory 232, and a system bus 230 for communicatively coupling the central processing unit 204 and the random access memory 232, The information handling system 200 may also include an input/output bus 210 and several peripheral devices, such as 212, 214, 216, and 218 may be attached to the input output bus 210. As shown in FIG. 2, the several peripheral devices 212, 214, 216 are positioned inside the housing 110 as well as the CPU 204, RAM 232, ROM 234 and buses 230 and 210. Peripheral device 212 is the display, peripheral device 214 is the set of input keys 214 and peripheral device 216 is the touch pad 216. The other peripheral devices are positioned outside the housing 110, such as the first expansion slot 130 and the second elongated expansion slot 140. The hand-held computer system 200 is not limited to a specific number of expansion slots or to the type of peripheral device that may be attached. As a result, FIG. 2 is provided with another peripheral device or expansion slot for a peripheral device 218. The type of peripheral devices that can be connected to the computing system 200 include hard disc drives, magneto optical drives, floppy disc drives, monitors, keyboards and other such peripherals. The computing system 200 includes an operating system, such as Palm OS.

FIG. 3 is a perspective view of an embodiment of a hand-held computer system 100 according to this invention. The hand-held computing device 100 includes the second elongated expansion slot 140 that has the interior surface 141. On the interior surface are sets of electrical contacts 310, which are shown generally in FIG. 3 as a dotted box, which includes several contacts.

In some embodiments, the electrical contact pads 311, 312, 319 on the interior surface 141 of the second elongated expansion slot 140 provide a universal serial bus type ("USB") connection to the input/output bus 210. Advantageously, the USB connection provides a high-speed serial communication link with a relatively low number of pins or electrical connections. USB type connections are becoming a preferred method of attaching peripheral devices to a computer system 200 because of the ability of USB connection and associated software to detect, power and configure the peripheral devices, as well as its ability to provide high-speed data transfer. A USB controller usually comprises software and a USB connector in a host hand-held computer 100. Communications with peripheral devices is carried on via transactions, which include commands for execution by functions in the peripheral device.

Figure 4:
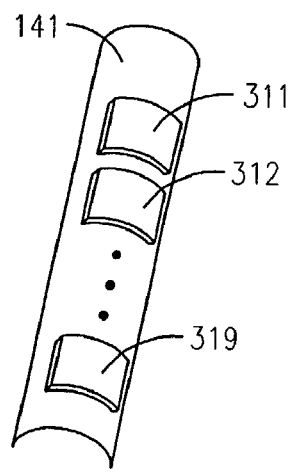
FIG. 4 is a view of the inner surface of an opening for a stylus input device of the hand-held electronic computer system according to this invention.

FIG. 4 is a more detailed view of the inner surface 141 of the elongated opening or second elongated expansion slot 140. The opening, or second elongated expansion slot, is adapted for receiving a stylus 120. FIG. 4 shows a portion of the interior surface 141 and includes electrical contacts 311, 312, and 319. Of course it should be noted that although only three electrical contacts 311, 312, 319 are shown in FIG. 4, that there could be any number of electrical contacts. The electrical contacts are set back or on a different level than the interior surface 141 of the second elongated expansion slot 140. This also prevents electrical contact should a regular stylus be inserted into the elongated opening, which corresponds to the second expansion slot 140. A regular stylus 120 is typically made of nonconductive material and does not have projections which would engage the electrical contacts 311, 312, 319 since they are set back or not at the same level as the interior surface 141 of the second expansion slot 140. Thus, in the event that a regular stylus was inserted into the opening or second expansion slot 140, there would be no repercussion resulting from an errant connection between two or more of the electrical contacts 311, 312, 319.

Turning briefly to FIG. 3, it should also be noted that there is a second elongated opening 340 at the other edge of the hand-held, information-handling device 100. The other elongated opening 340 includes an interior surface 341, In some embodiments, the elongated opening 340 is provided with similar electrical contacts, thus making the elongated opening 340 into a third expansion slot. In some other embodiments, the elongated opening 340, and specifically the interior surface, is not provided with additional electrical contacts. additional electrical contacts. In other words, the slot 340 is merely for holding an elongated device, such as a stylus. In still other embodiments of the computing system 100, the elongated slot 340 is not provided.

Returning to FIG. 4, it should be noted that the three electrical contacts shown, 311, 312, 319, can be spaced at different intervals other than the spacing shown. In one embodiment of the invention, the electrical contact 319, which is most distant from the open end 320 of the second, elongated expansion slot 140, is used as a sensor or indicator that a connector or connecting unit has been fully inserted into the slot or second elongated expansion slot 140. When electrical connection is made with electrical contact 319, this enables or provides power and makes the electrical connection between the other electrical contacts, such as 311 and 312. In an alternative embodiment, a switch may be provided at or near the distal end of the second, elongated expansion slot 140. A switch 321 at the distal end 322 of the slot could also be used to enable power and signals to the three or more electrical contacts 311, 312, 319.

Figure 5A:
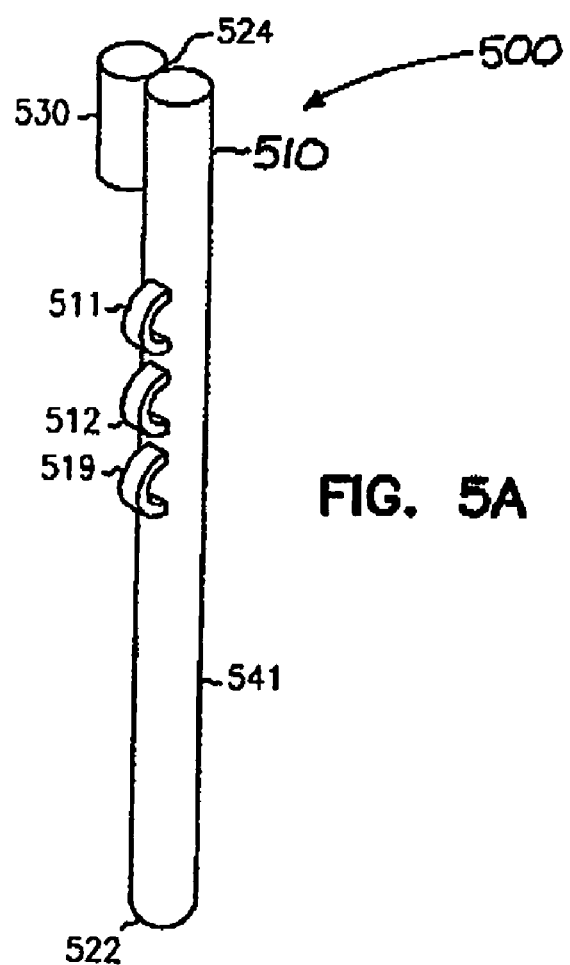
FIG. 5A is a depiction a connector according to this invention.

FIG. 5A is a depiction of a connector 500, according to this invention. The connector 500 includes an elongated member 510 having an exterior surface 541. One end 522 of the connector is rounded or pointed. The geometric shape of the end 522 corresponds to the geometric shape of the distal end of the second, elongated expansion slot 140. In other words, the elongated body of the connector 500 fits within the elongated opening associated with the second, elongated expansion slot 140. The connector 500 has another end 524 which includes an extension or tab 530. The extension or tab 530 fits within a portion of the expansion slot 140 and serves to register the position of the connector 500 with respect to the second expansion slot 140. In other words, for the connector 500 to to be fully inserted within the second, elongated expansion slot 140, the tab 530 must be positioned so that it too can fit within the slot 140 at its open end 320.

Figure 5B:
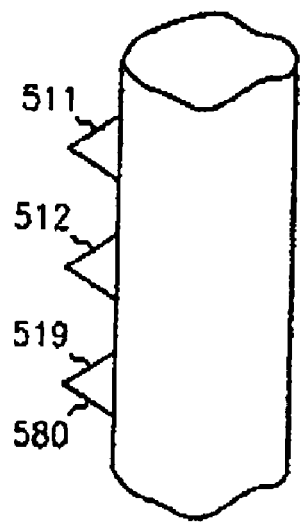
FIG. 5B is a cross-section view of the contacts associated with one embodiment of the connector.

Projecting out from the exterior surface 541 of the connector 500 are electrical contacts 511, 512, and 519. FIG. 5B shows a detailed cross-sections of the contacts of the connector 500. The electrical contacts 511, 512, 519 are V-shaped. The tip 580 of the V-shape is the portion of the contact 511, 512, 519 that contacts or swipes the contacts 311, 312 and 319 of the second expansion slot 140. The V-shaped contact is spring loaded so that the V-shaped contacts 511, 512, 519 project into the openings or project toward the electrical contacts 311, 312, 319 when fully inserted and correctly positioned within the second, elongated expansion slot 140. When V-shaped contact 519 contacts electrical contact 319, the connection indicates that a connector or connecting unit 500, such as the pen shown, has been fully inserted into the slot or second elongated expansion slot 140. When electrical connection is made between electrical contact 319 and V-shaped contact 519, this enables the circuit or activates the electrical circuit formed between the other electrical contacts, such as 311 and 312, and the contacts 511, 512 on the connector 500. Until the contact between 319 and 519 is engaged, the electrical circuit is not activated to protect the circuit from damage or malfunction. The V-shaped contacts also deflect or bend to allow for insertion and removal of the connector from the second expansion slot 140 (see FIG. 3).

Figure 5C:
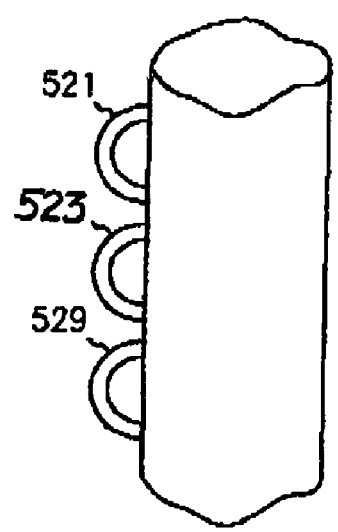
FIG. 5C is a cross-section view of the contacts associated with one embodiment of the connector.

FIG. 5C shows another embodiment of the detailed cross-section of the contacts of the connector 500. It should be noted that the contacts 521, 523 and 529 have another shape. Many shapes are contemplated. A set C-shaped contacts 521, 523, 529 allow for deflection of the contact so that the connector 500 can be both inserted and removed from the second expansion slot 140. The C-shaped contacts 521, 522, and 529 are dimensioned so that they fit within the slots associated with contacts 311, 312, and 319.

Figure 6:
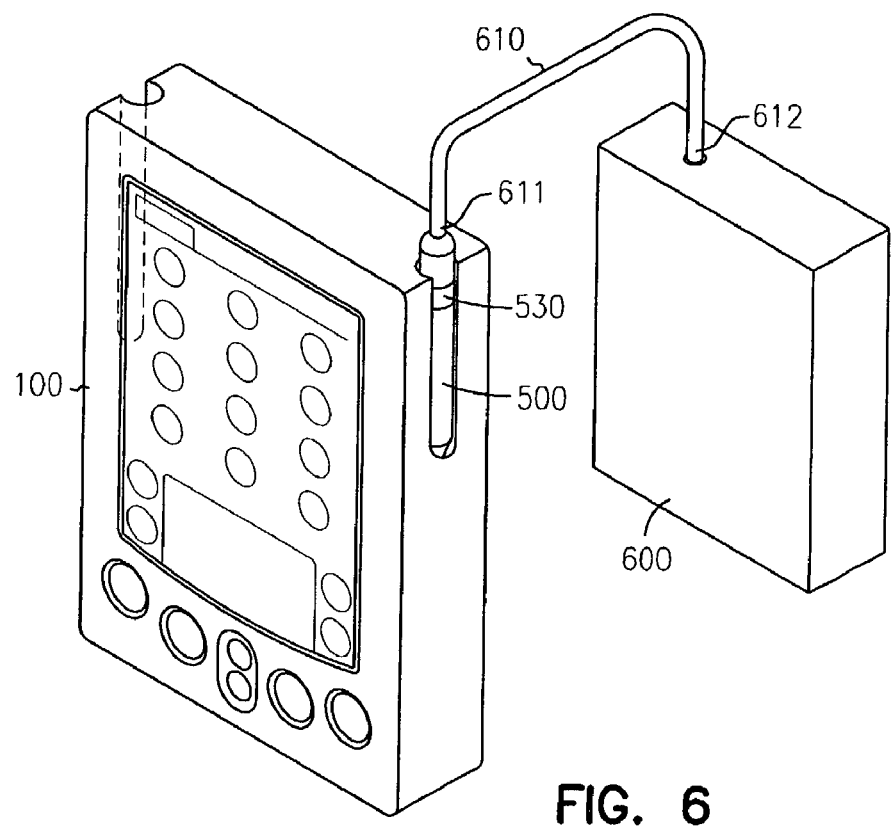
FIG. 6 is a depiction of a peripheral device attached to the hand-held computer using the connector and a cable according to this invention.

FIG. 6 is a perspective view of a peripheral device 600 attached to the handheld information-handling device 100 using the connector 500 and a cable 610. The cable 610 carries signals to and from the peripheral device 600. The cable 610 has a first end 611 and a second end 612. Connector 500 is attached to the first end 611. The peripheral device 600 is attached to the second end 612 of the cable. It should be noted that the second end 612 could also be provided with a connector that would interact with a mating slot or mating slot or mating portion associated with the peripheral device 600. The peripheral device 600 could also be looked upon as being a second electronic or electrical device, which is attached to the hand-held, information handling system 100.

Figure 7:
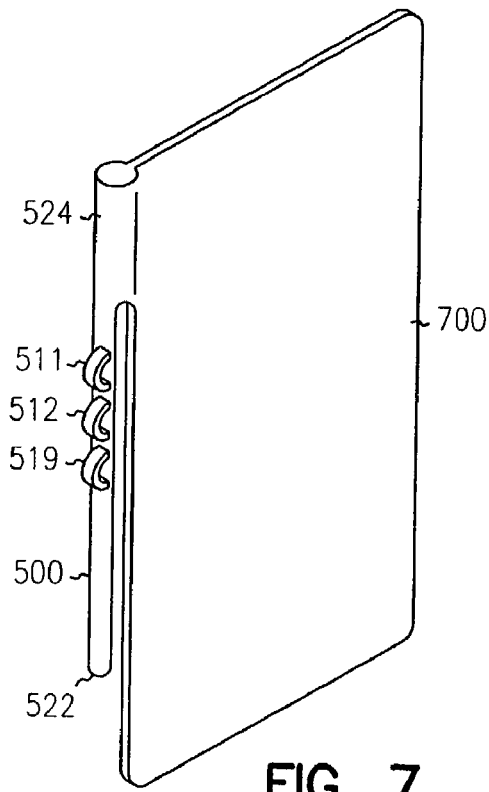
FIG. 7 is a perspective view of a first embodiment of connector and a system cover.

FIG. 7 is a perspective view of a connector 500 attached to a flexible system cover 700, which contains a peripheral device. In this particular embodiment, the flexible cover 700, and specifically the portion that is attached to the end 524 of the connector, serves to register or position the contacts 511, 512, 519 of the connector with respect to the second elongated expansion slot 140. The system cover may be a flexible cable material capable of hundreds of repeated bending and elastic deformation without failing. The cover 700 could cover the entire display 212 of the hand-held, computing or information handling device 100, or it could partially cover the display. The flexible cover 700 will include circuitry which may embody an electrical circuit or which may be attached to an auxiliary battery associated with the cover 700. The peripheral device associated with the cover 700 could also be a keyboard or any other peripheral device, which could be embodied within the cover 700.

Figure 8:
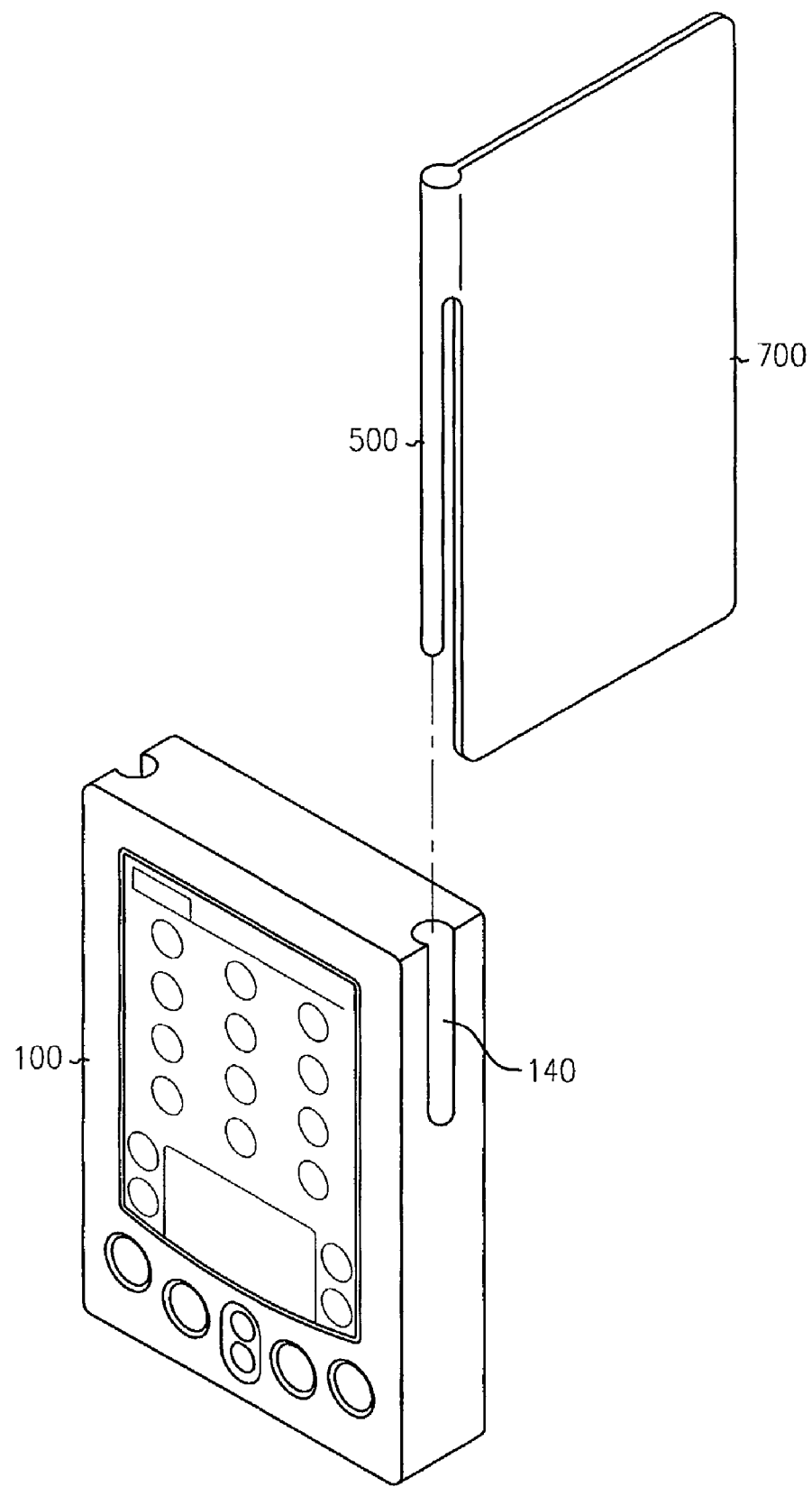
FIG. 8 is an exploded perspective view of the first embodiment of a connector and system cover about to be attached to the hand-held computing device.

FIG. 8 is an exploded perspective view of the first embodiment of the connector 500 and system cover 700 combination, which is about to be attached to the hand-held computing device 100. The connector 500 is attached or slips within or fits within the second, elongated expansion slot 140. The electrical contacts 519, 511, 512 make electrical contact with corresponding electrical contacts 311, 312, 319 positioned along the interior surface 141 of the second, elongated expansion slot 140. The end of the connector 524 to which the system cover 700 and peripheral device is attached serves to register the electrical connectors 511, 512, 519 on the connector end with the electrical connectors 311, 312, 319 within the second, elongated expansion slot.

Figure 9:
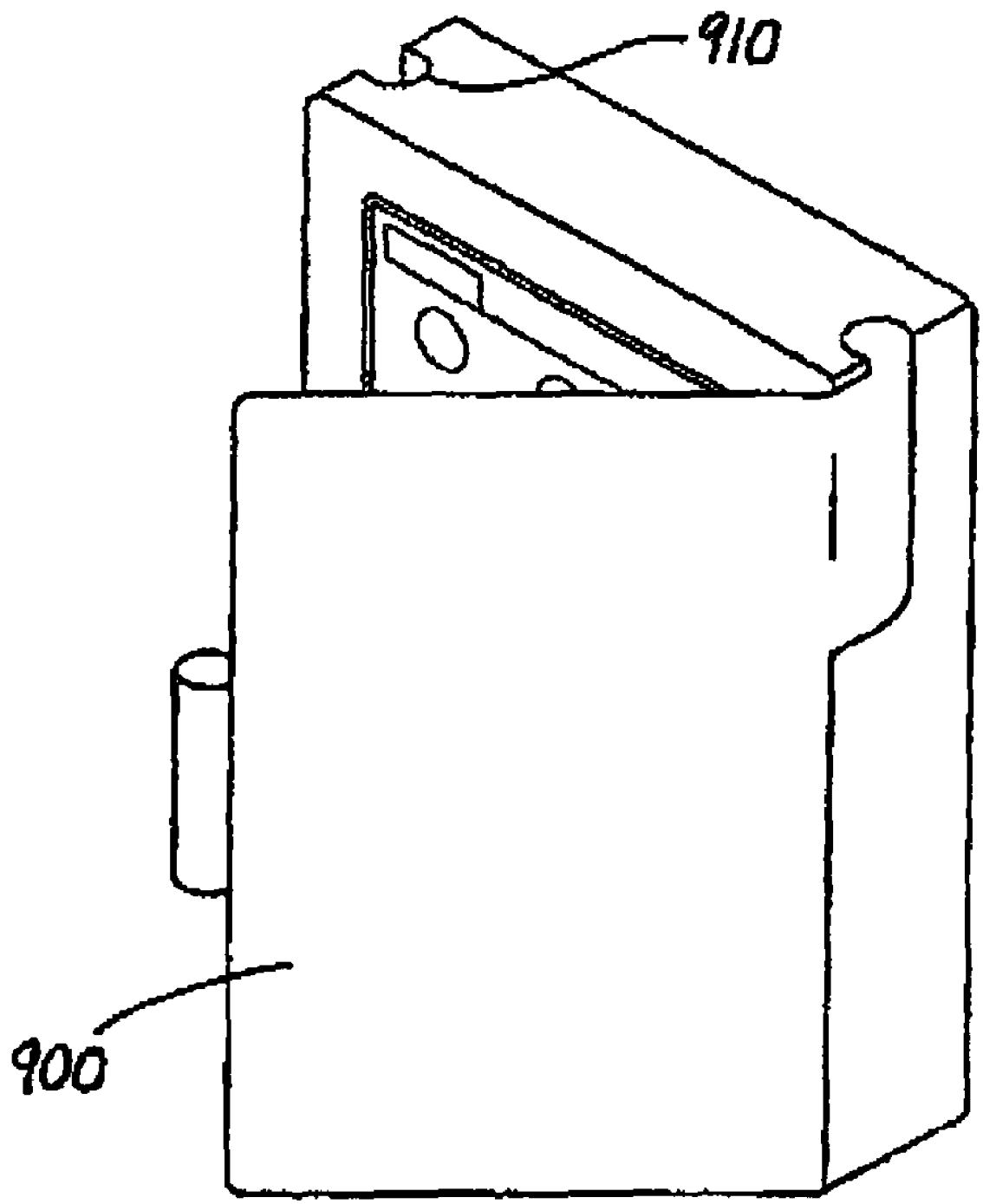
FIG. 9 is a perspective view of a second embodiment of connector and a system cover.

FIG. 9 shows the perspective view of a second embodiment of the connector 500 and system cover 900 within the expansion slot 140. In this particular embodiment, the main difference is that a sleeve 910 is provided on a free edge of the system cover 900 so that it can receive a regular stylus 120 (as shown in FIG. 1).

CONCLUSION

A hand-held computing system includes a housing with an elongated opening for receiving a nonelectronic input device. The elongated opening has an inside surface. At least two electrical contacts are positioned on the inside surface of the elongated opening. In one embodiment, the nonelectronic input device is a stylus. The hand-held computing system also includes a cable with at least two electrical contacts for electrically contacting the at least two electrical contacts on the inside surface of the elongated opening. A microprocessor is positioned within the housing. The cable places a peripheral computing device in communication with the microprocessor within the housing. The hand-held computing system also includes a cover portion adapted to cover at least a portion of the housing, and a connection portion having an end, which fits within the elongated opening. In some embodiments, the connection portion has at least two electrical contacts which contact the at least two electrical contacts on the inside surface of the elongated opening. The cover portion is attached to the connection portion. In some embodiments, the cover portion includes an edge and the connection portion is attached to the cover portion along the edge of the cover portion. In some embodiments the cover portion includes a keyboard or a battery. In some embodiments, the cover portion includes both a keyboard and a battery. The hand-held computing system also includes a display. The housing has an opening therein. The display fits within the opening in the housing. The cover portion is dimensioned to covers the display or at least a portion of the display. The cover portion can include a stylus holder which can be positioned proximate the edge of the cover portion. In some embodiments, the elongated opening can include a sensor for enabling power and signals to the at least two electrical contacts located on the interior of the elongated opening. The sensor can be positioned within the elongated opening at a position distal from the at least two contacts. The sensor can determine if a substitute for the stylus has been inserted into the elongated opening.

Also disclosed is a method for expanding a hand-held personal organization device. The method includes finding an existing structure having a mating portion on the housing, adding at least two electrical contacts to the existing structure, and substituting a substitute mating portion for the original mating portion. The substitute mating portion has at least two electrical contacts, which correspond to the added electrical contacts of the existing structure. The two electrical contacts can be added to the interior of the existing structure. The method can also include sensing when the substitute mating portion has been inserted into the existing structure or sensing when the substitute mating portion has been fully inserted into the existing structure.

Also disclosed is a device including a plug adapted to fit within the stylus opening in the housing of a personal data assistant. A second electrical portion is attached to the plug. The second electrical portion is adapted to be electrically connected to an information handling system housed within a personal data assistant. The device also includes a stylus and a structure for holding the stylus attached to the second electrical portion. The second electrical portion can be a peripheral device.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A hand-held computing system comprising:
    a housing having an elongated opening therein, the elongated opening being configured to receive a nonelectronic input device, the elongated opening having an inside surface, at least two electrical contacts being positioned on the inside surface of the elongated opening;
    a cover portion configured to cover at least a portion of the housing;
    a connection portion having an end which fits in the elongated opening and which has at least two electrical contacts which make electrical contact with the at least two electrical contacts on the inside surface of the elongated opening when the connection portion is positioned in the elongated opening, the cover portion being attached to the connection portion; and
    a stylus holder mounted on the cover portion, the stylus holder being capable of receiving a stylus;
    wherein the elongated opening of the housing has a blind end portion, and
    wherein a first portion of the connection portion is positioned adjacent to a portion of the cover and the first portion of the connection portion is attached to the adjacent portion of the cover; and
    wherein a second portion of the connection portion that is located adjacent to the end of the connection portion is free of attachment to an adjacent portion of the cover such that the second portion is insertable into the blind end portion of the elongated opening of the housing.

2. The hand-held computing system of claim 1 wherein the cover portion includes a keyboard.

3. The hand-held computing system of claim 1 wherein the cover portion includes a battery.

4. The hand-held computing system of claim 1 further comprising a display, wherein the housing has an opening therein, the display fitting within the opening in the housing, wherein the cover portion is dimensioned to cover at least a portion of the display.

5. The hand-held computing system of claim 1 further comprising a display, wherein the housing has an opening therein, the display fitting within the opening in the housing, wherein the cover portion is dimensioned to cover the display.

6. The hand-held computing system of claim 1 wherein the stylus holder comprises an elongated loop.

7. The hand-held computing system of claim 1 wherein the cover portion further includes an edge and wherein the stylus holder is positioned proximate the edge of the cover portion.

\* \* \* \* \*